United States Patent
Dorval et al.

(10) Patent No.: US 6,554,430 B2
(45) Date of Patent: Apr. 29, 2003

(54) VOLUMETRIC THREE-DIMENSIONAL DISPLAY SYSTEM

(75) Inventors: Rick K. Dorval, Goffstown, NH (US); Michael Thomas, Belmont, MA (US); Jane L. Bareau, Needham, MA (US)

(73) Assignee: Actuality Systems, Inc., Burlington, MA (US)

( * ) Notice: Subject to any disclaimer, the term of this patent is extended or adjusted under 35 U.S.C. 154(b) by 0 days.

(21) Appl. No.: 09/948,060

(22) Filed: Sep. 6, 2001

(65) Prior Publication Data

US 2002/0067467 A1 Jun. 6, 2002

Related U.S. Application Data

(60) Provisional application No. 60/230,972, filed on Sep. 7, 2000.

(51) Int. Cl.⁷ ............................ G03B 21/28; G09G 5/10
(52) U.S. Cl. ...................... 353/7; 359/446; 359/477; 359/471
(58) Field of Search ...................... 353/7, 10; 359/446, 359/471, 477, 478, 479

(56) References Cited

U.S. PATENT DOCUMENTS

| | | | |
|---|---|---|---|
| 4,648,045 A | 3/1987 | Demetrescu | |
| 4,839,828 A | 6/1989 | Elsner et al. | |
| 4,943,851 A * | 7/1990 | Lang et al. | 348/37 |
| 4,983,031 A | 1/1991 | Solomon | |
| 5,148,310 A | 9/1992 | Batchko | |
| 5,172,266 A * | 12/1992 | Garcia et al. | 359/478 |
| 5,537,251 A * | 7/1996 | Shimada | 359/462 |
| 5,574,836 A | 11/1996 | Broemmelsiek | |
| 5,606,454 A * | 2/1997 | Williams et al. | 359/462 |
| 5,678,910 A * | 10/1997 | Martin | 353/7 |
| 5,754,147 A | 5/1998 | Tsao et al. | |
| 5,936,767 A | 8/1999 | Favalora | |
| 5,954,414 A | 9/1999 | Tsao | |
| 6,049,317 A | 4/2000 | Thompson et al. | |
| 6,072,545 A * | 6/2000 | Gribschaw et al. | 348/756 |
| 6,302,542 B1 * | 10/2001 | Tsao | 353/7 |

FOREIGN PATENT DOCUMENTS

| EP | 0312720 | 4/1989 |
|---|---|---|
| EP | 0827129 | 3/1998 |

OTHER PUBLICATIONS

International Search Report for PCT/US01/27585.
"Optimized Drawing of Filled and Unfilled Circles in a Two–Dimensional Graphics System", *IBM Technical Disclosure Bulletin,* vol. 33, No. 6B, Nov. 1, 1990, pp. 291–295.
B. Lacotte, "Elimination of Keystone and Crosstalk Effects in Stereoscopic Video", *Rapport Technique De L'Inrs–Telecommunications,* No. 95–31, Dec. 22, 1995, pp. 1–27.

* cited by examiner

Primary Examiner—William Dowling
(74) Attorney, Agent, or Firm—Fish & Richardson P.C.

(57) ABSTRACT

The invention features a volumetric display system including an optical relay, a motor, a support structure coupled to the motor, a projection screen disposed on the support structure, and a projection optic. During operation, the projection optic receives a light beam from the optical relay and projects the light beam onto the projection screen. Also, the motor rotates the support structure, the projection screen, and the projection optic about a rotation axis.

21 Claims, 6 Drawing Sheets

VOLUMETRIC THREE-DIMENSIONAL DISPLAY SYSTEM

Under 35 USC §119(e)(1), this application claims the benefit of prior U.S. provisional application 60/230,972, filed Sep. 7, 2000, the contents of which are incorporated herein by reference.

TECHNICAL FIELD

This invention relates to three-dimensional displays, and more particularly to volumetric three-dimensional displays.

BACKGROUND

Volumetric displays are a class of three-dimensional display technology that produce volume-filling imagery. Typically, volumetric displays are autostereoscopic; that is, they produce imagery that appears three-dimensional without the use of additional eyewear.

Some volumetric displays create three-dimensional imagery by employing spatio-temporal multiplexing in emitting or scattering light from a range of locations within an image volume. In other words, a smaller number of light-generating devices (for example, lasers, projector pixels, etc.) are run at a higher frequency than an overall volumetric refresh rate, and the light is imaged onto a rotating surface. Persistence of vision integrates the image slices formed at different spatio-temporal locations of the volume swept by the rotating surface, and the viewer perceives a volume-filling, three-dimensional image.

The concept of a volumetric display in which three-dimensional imagery is perceived by visual integration of a series of images projected on a rotating screen has existed since, at least, the late 1950s. In 1958, Max Hirsch filed a patent application for a "generescope," wherein imagery formed on the surface of a cathode ray tube (CRT) is relayed by a periscope-like arrangement that images onto a rear-projection screen. In the generescope, the CRT, mirrors, and screen rotated in unison. The arrangement of rotating relay mirrors keeps the projection optical path length invariant with respect to the projection screen angle. For this, Hirsch was issued U.S. Pat. No. 2,967,905 in 1961.

A 1960 *Aviation Week* article entitled "New Display Gives Realistic 3-D Effect," (pp. 66–67, Oct. 31, 1960) describes a 3-D display developed by ITT Laboratories. It is similar to the display taught by Hirsch, in that a sequence of 2-D images formed on the surface of a CRT are relayed to a rotating projection screen by an arrangement of mirrors that rotate with the projection screen, thereby keeping the projection optical path length invariant with respect to the projection screen angle. However, the ITT display employs a stationary CRT and front-end optical components. One consequence of their architecture is that the CRT's image rotates in the plane of the projection screen as the projection screen rotates.

Other volumetric displays which employ similar radially-extended relay optics include the volumetric displays described by Batchko (U.S. Pat. No. 5,148,310) and Tsao et al. (U.S. Pat. Nos. 5,754,147 and 5,954,414). Batchko describes a volumetric display wherein a rotating screen is illuminated by a fixed, vector-scanned laser illumination source. Tsao and co-workers utilize a k-mirror system, which rotates at half of the screen's angular frequency, to prevent the image of the projector from rotating in the plane of the projection screen.

SUMMARY

The invention features systems and methods for producing three-dimensional volume-filling imagery. A volumetric display system produces a volume image by projecting a series of two-dimensional images onto a rapidly rotating projection screen. Persistence of the human visual system integrates these two-dimensional image slices into a three-dimensional volume-filling image.

In general, in one aspect, the invention features a volumetric display system including an optical relay, a motor, a support structure coupled to the motor, a projection screen positioned on the support structure, and a projection optic. During operation, the projection optic receives a light beam from the optical relay and projects the light beam onto the projection screen. Also, the motor rotates the support structure, the projection screen, and the projection optic about a rotation axis.

Embodiments of the display system may include any of the following features.

The display system may further include having the projection optic positioned on the rotation axis.

The projection optic may also be a projection lens. In some embodiments, the projection lens has a lens axis, and the lens axis and the rotation axis define an angle of no more than about 10 degrees. Moreover, the angle may between about 4.9 degrees and 5.0 degrees. The projection lens may be a triplet lens.

The display system may further include having the projection screen, defining a plane, positioned on the support structure so that the rotation axis lies in the plane defined by the screen.

The system may still further include a first and second mirror placed on the support structure. During operation, the motor rotates the first and second mirrors about the rotation axis. Also, the first mirror receives the light beam from the projection optic and directs the light beam to the second mirror, and the second mirror directs the light beam to the projection screen.

The system may additionally include a third mirror placed on the support structure. During operation the motor also rotates the third mirror about the rotation axis, and the third mirror receives the light beam from the second mirror and directs the light beam to the projection screen.

In some embodiments, the support structure may be a platform having a hole, and the projection lens may be mounted within the hole.

Also, the optical relay may include a relay lens and a field lens. During operation the relay lens can receive the light beam from a light source and relay the light beam to the field lens, and the field lens relays the light beam to the projection lens.

In general, in another aspect, the invention includes a method of producing volume-filling imagery. The method includes: (i) rotating a projection optic and a projection screen about a rotation axis; (ii) supplying a light beam from a stationary light source; and (iii) projecting the light beam through the projection optic onto the projection screen.

Embodiments of the method may further include any of the following features.

The projection optic may be a projection lens having a lens axis, and the method further includes tilting the projection lens so that the lens axis defines an angle with the rotation axis, the angle being no more than about 10 degrees.

The method may also include rotating a first and second mirror about the rotation axis. Furthermore, the projection optic may project the light beam onto the first mirror, the first mirror may direct the light beam onto the second mirror, and the second mirror may direct the light beam onto the projection screen.

Some embodiments may further include rotating a third mirror about the rotation axis. The third mirror may receive the light beam from the second mirror and may direct the light beam onto the projection screen.

In some embodiments, the method further includes directing the light beam from the light source onto the projection optic using an optical relay. Furthermore, the optical relay may include a mirror, and the method may include adjusting the mirror to center the light beam on the projection screen.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Three-dimensional volumetric displays that embody the invention include a projection system that has two fundamental parts: a front-end that supplies and relays the image, and a back-end that delivers the image to the viewer. The front-end is stationary, mounted below the viewing volume and out of sight from the viewer. It receives and processes data and instructions from a computer, and generates the image. The computer is also a user interface. The back-end is mounted on, or coupled to, a platform that sits above the front-end, and rotates with the platform during operation. The back-end delivers the image supplied by the front-end to a screen, which is mounted on and also rotates with the platform.

Figure 1:
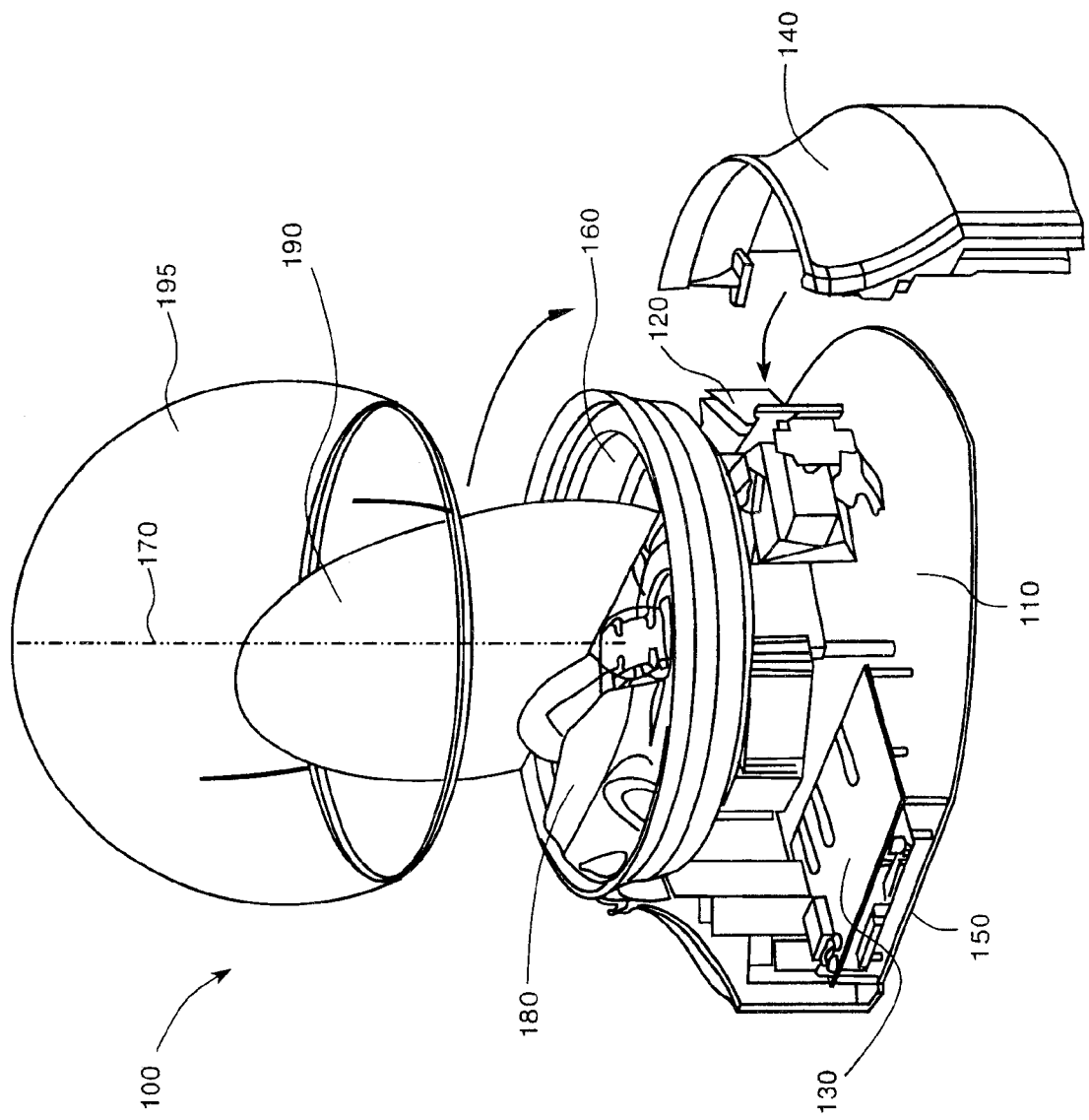
FIG. 1 is a perspective view of a volumetric display.

FIG. 1 shows an embodiment of a volumetric display 100. The volumetric display includes a base plate 110, on which is mounted a projection system 120, front-end projection optics (not shown), system electronics 130, and a frameless DC motor (not shown). Also mounted on base plate 110 is a casing 140, which encloses the abovementioned components mounted on base plate 110, protects them, and hides them from view. A computer connects to system electronics 130 through interface 150.

A circular platform 160 is positioned above projection system 120 and the front-end projection optics. Platform 160 is concentrically mounted on an annular shaft of the frameless DC motor. During operation the motor rotates the shaft and platform 160 about a rotation axis 170. Part of back-end projection optics 180 and a projection screen 190 are mounted on platform 160, and also rotate about axis 170 during operation. A transparent dome 195 encases projection screen 190 and back-end optics 180, slotting into a flange that is mounted on the periphery of platform 160. Dome 195 is also rotated during operation. A second dome (not shown) encases dome 195. The second dome is stationary during operation.

Volumetric display 100 works as follows: a host computer sends image data and commands to display 100 through interface 150. System electronics 130 processes this information into voxel data and stores the processed data in graphics memory until it is needed for display. When needed, system electronics 130 sends the image information to the projection engine, where projection engine 120 converts it to optical information by spatially modulating a beam of light. The light beam leaves the projection engine, and front-end projection optics directs the beam onto axis 170 and toward platform 160. Front-end projection optics include a series of lenses and mirrors that focus the light beam through a projection lens, which is mounted in the annular shaft of the frameless DC motor and a hole in platform 160. A series of mirrors mounted on platform 160 relay the light beam to projection screen 190, where it forms a two-dimensional image.

The motor rotates platform 160, back-end projection optics, and projection screen 190 at at least about 600 rpm. The motor rotates all of these components at the same angular velocity. System electronics and projection engine 120 refresh the two-dimensional image at least about 4,000 times per second. Each two-dimensional image forms an "image slice" of the three-dimensional volume image. At these projection and rotation rates the human visual system perceptually fuses the "image slices" into a volume-filling, three-dimensional image.

The projection system is designed to be highly compact so as to fit within a very limited space within casing 140 and dome 195, while at the same time providing the desired image magnification (i.e., about 20x) and resolution. The projection system is additionally designed to relay the light beam from a stationary source to a moving screen. An embodiment of such an optical projection system is described in detail below.

Figure 2A:
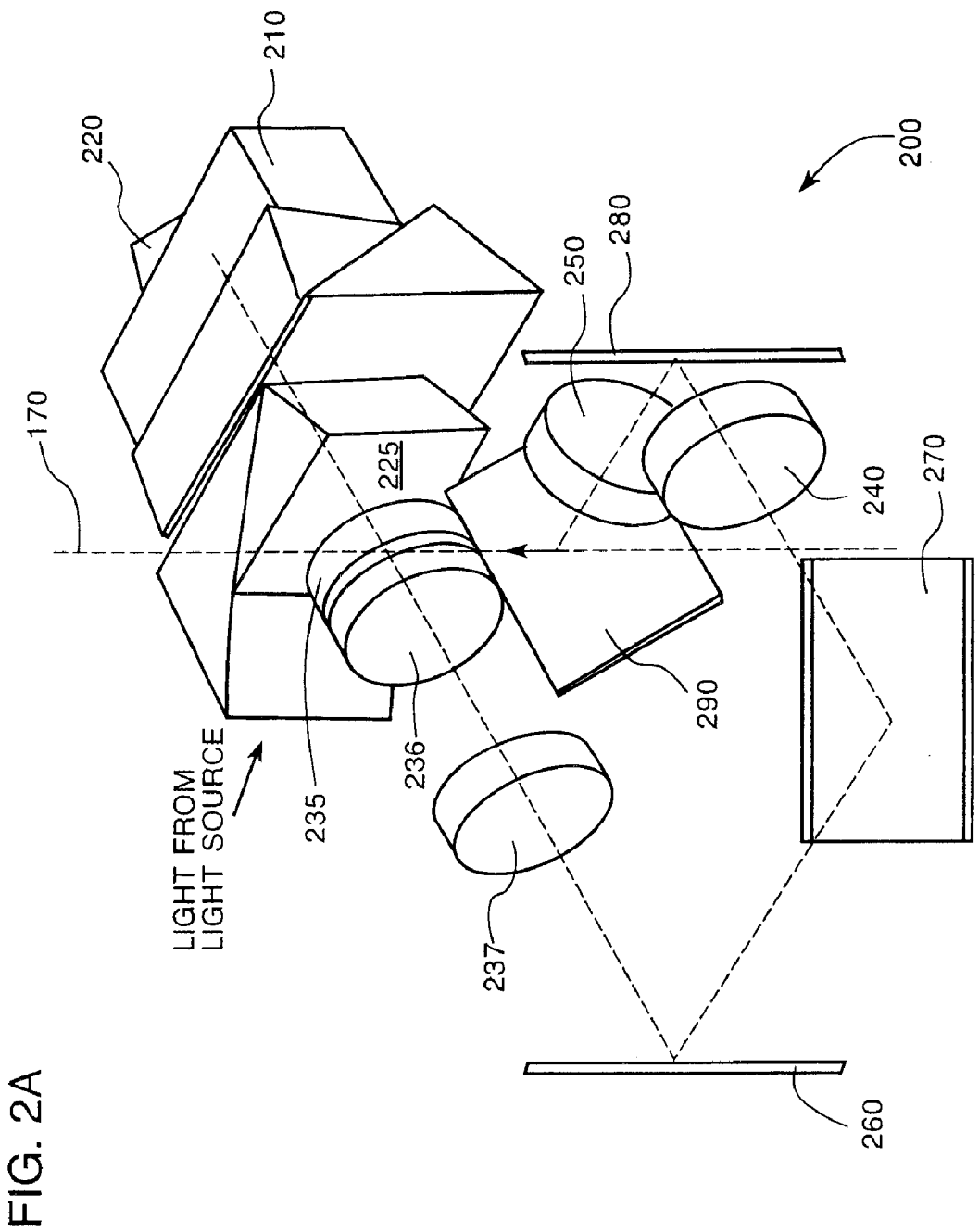
FIG. 2A is a perspective view of the front-end optics and part of the projection engine.
Figure 2B:
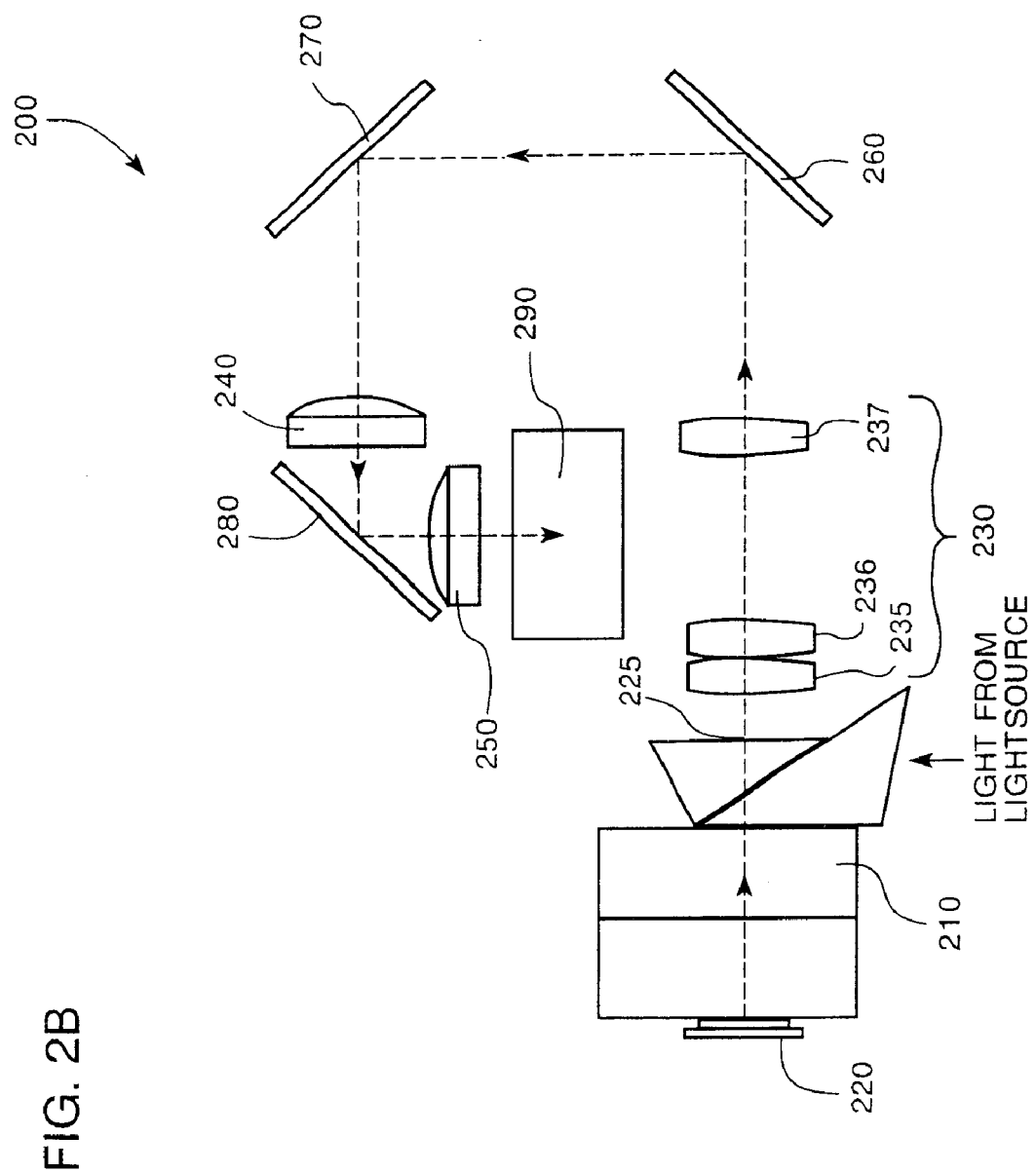
FIG. 2B is a top-down view of the front-end optics and part of the projection engine.

Referring to FIG. 2A and FIG. 2B, front-end optical components 200 are mounted on base 110 of display 100, underneath platform 160 (see FIG. 1). FIGS. 2A and 2B also show part of projection engine 120 (see FIG. 1). The projection engine includes a lightsource and homogenizing and collimating optics (not shown), which delivers a broadband light beam to a prism assembly 210. Prism assembly 210 splits the light beam into its three primary color components (i.e., red, green, and blue), and directs each component to a spatial light modulator (SLM) 220 (only one shown). The SLMs are micro-electromehcanical systems (MEMS) arrays of switchable micromirrors (e.g., Texas Instruments DMD™s), capable of producing XGA-resolution (1024×768) imagery at a frequency of at least about 4 kHz. Each SLM spatially modulates its respective incident light beam to generate a red, green, or blue component image. These images are recombined inside prism assembly 210 to create a full color image (8 colors), which exits the projection engine at a surface 225.

Projection engine 120 directs the light beam to a telecentric relay lens system 230. Relay lens system includes three doublet lenses 235, 236, and 237. Relay lens system 230 images SLM 220 to an intermediate image about 600 millimeters away from the projection engine. The intermediate image, having 3.8× magnification is formed between two field lenses, 240 and 250, which are also doublet lenses. The function of the field lenses is discussed below.

Relay lens system 230 images the SLMs to an intermediate image to keep the optical path length and image magnification within the constraints provided by the display housing. Imaging the SLM directly to the projection screen would require a much longer optical path length than in the current embodiment. This is due to the large amount of glass in prism assembly 210 between SLM 220 and the optical projection system. Imaging to the projection screen from an intermediate image allows projection optics to be placed close to the intermediate image, and a much shorter optical path is achieved.

Included in front-end optics 200 are three fold mirrors, 260, 270, and 280. These mirrors fold the projection light path to maintain it within the volume provided by the display casing. Mirrors 260, 270, and 280 also direct the beam to mirror 290, which is located on axis 170 and directs the beam out of the plane of base 110 (see FIG. 1) and along rotation axis 170 and onto a projection lens. At the projection lens, rotation axis 170 is coincident with the optical axis of the projection system. Fold mirrors 260 and 270 are manually adjustable during operation, enabling a user to accurately center the image on the projection screen.

Figure 3:
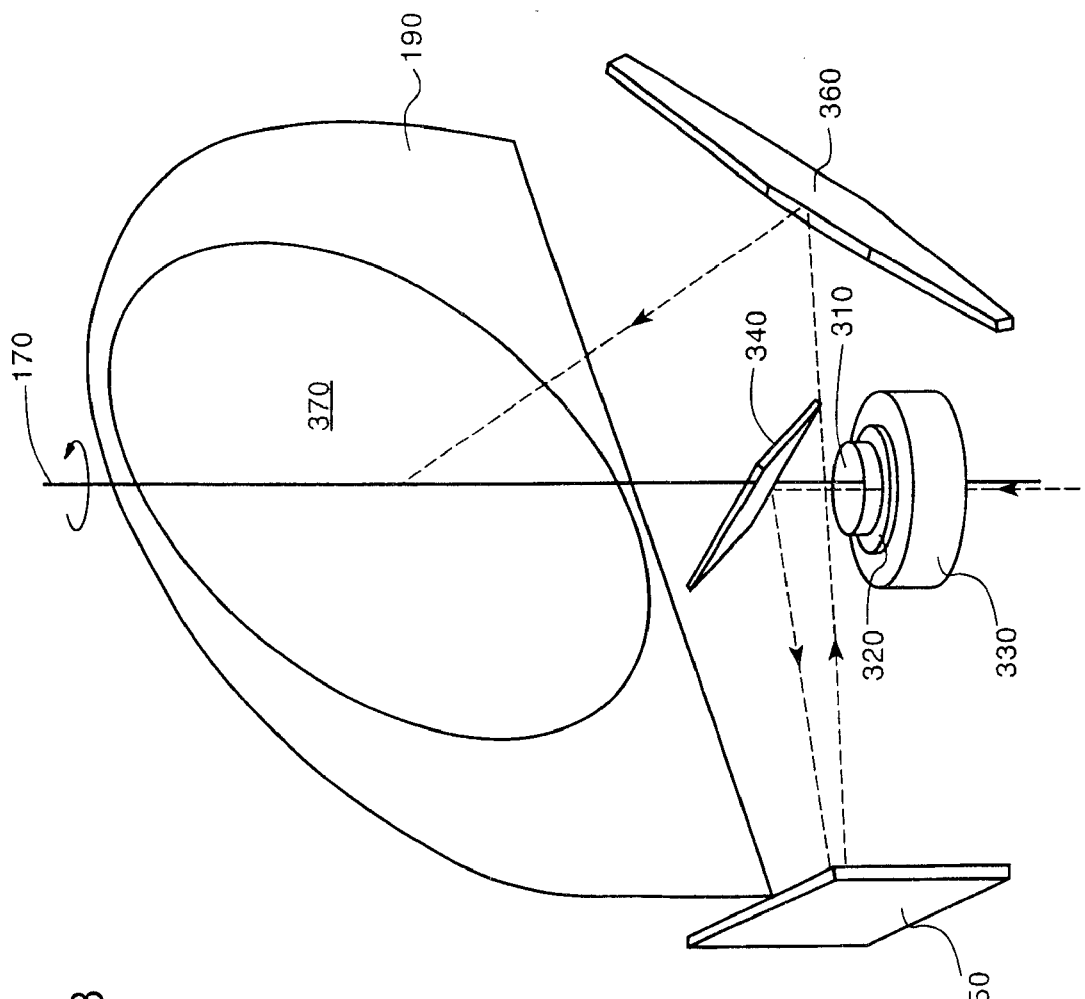
FIG. 3 is a perspective view of the back-end optics and motor.

Referring to FIG. 3, a projection lens 310 focuses the light beam through an annular shaft 320 of frameless DC motor 330. Projection lens 310, along with mirrors 340, 350, and 360 make up the back-end of the optical projection system. Mirrors 340, 350, and 360 are mounted on platform 160 (see FIG. 1) and fold the path of the light beam, maintaining it within the confines of dome 195 (see FIG. 1). Projection lens 310 directs the light beam to mirror 340, mirror 350 directs the light beam to mirror 360, mirror 350 directs the light beam to mirror 360, and mirror 360 directs the light beam to projection screen 190, forming a magnified image of the SLM in area 370. Image area 370 spans a diameter of about 10 inches, corresponding to about 20× magnification of the image at the SLM. The SLM image is cropped to provide a resolution of 768×768 pixels. As mentioned above, during operation, motor 330 rotates the back-end optics (i.e., projection lens 310 and mirrors 340, 350, and 360) about axis 170.

Figure 4:
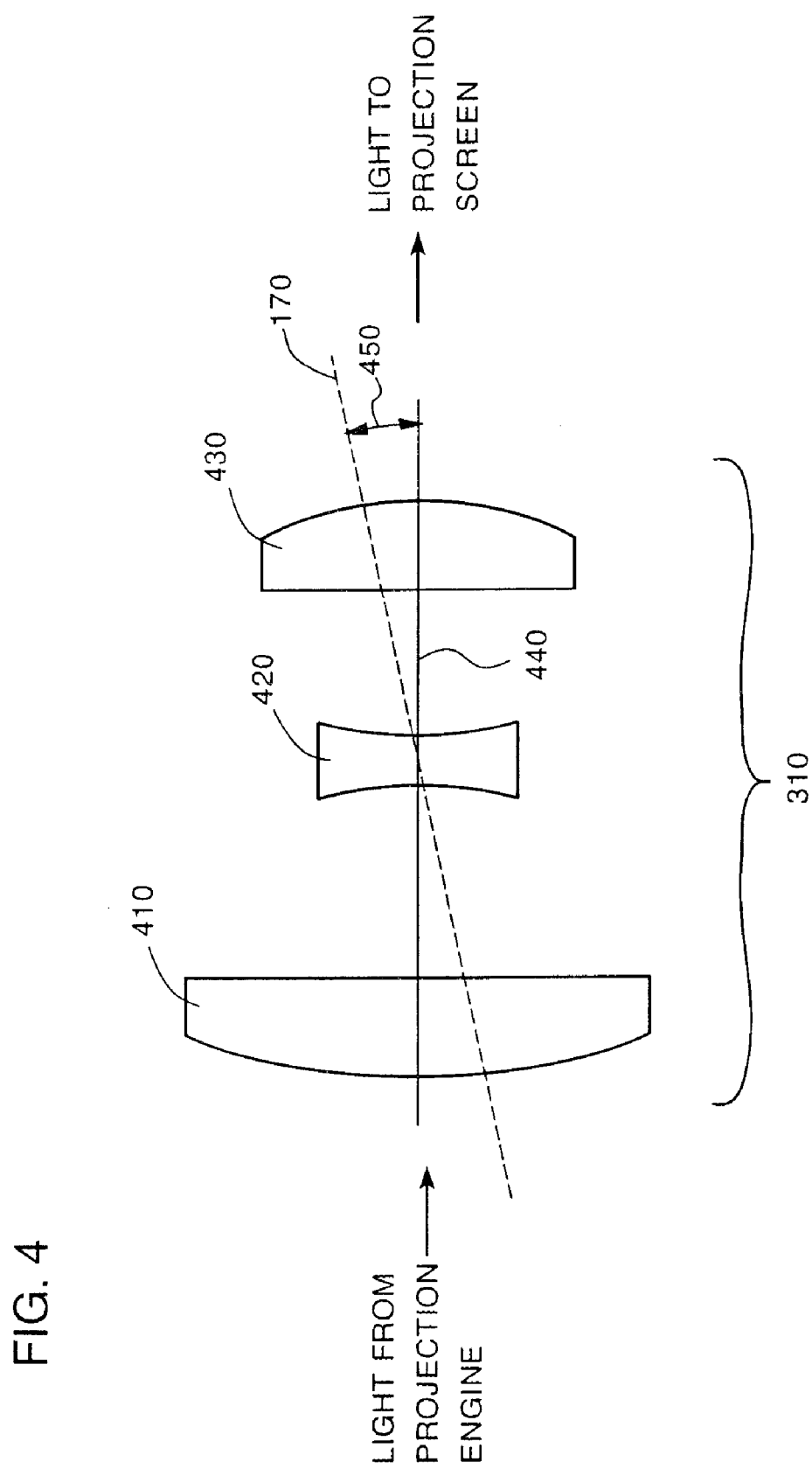
FIG. 4 is a side view of a projection lens.

Referring to FIG. 4, projection lens 310 includes a lens triplet assembly: lenses 410, 420, and 430. Lenses 410, 420, and 430 are aligned co-axially along lens axis 440. Lens axis 440 is tilted at an angle 450 of no more than about 10 degrees (e.g., at about 4.94 degrees) with respect to the projection system's optical axis, which is coincident with rotation axis 170 at this point. The light beam enters projection lens 310 through lens 410, and is focused to a waist near lens 420. At the first surface of lens 410, lens axis 440 is displaced from the optical axis by about 5.9 millimeters. Focusing the beam to a waist is necessary to fit the light beam through the aperture provided by motor 330 (see FIG. 3). The light beam exits projection lens 310 through lens 430. The purpose for this design of projection lens is apparent when one examines the unfolded optical path of the projection system.

Figure 5:
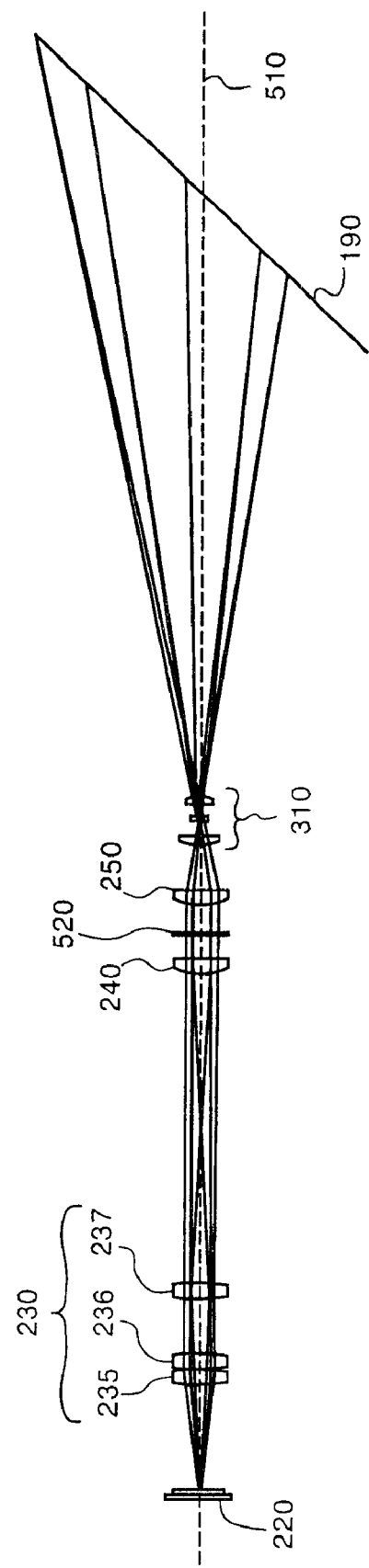
FIG. 5 is a view of the unfolded optical path of a projection system.

Referring to FIG. 5, which shows the unfolded optical path, projection screen 190 is at a 45 degree angle with respect to the projection system's optical axis 510. It is for this reason that projection lens 310 is tilted with respect to the optical axis 510. Tilting the projection lens tilts the plane of the image by a predictable amount, given by the so-called Scheimflug condition. This reduces the distortion introduced by projecting an image onto a plane that is non-perpendicular with respect to the optical axis. Tilt angle 450 depends on the angle between the projection screen plane and the optical axis, and both angles are not limited to the values above.

Projection lens 310 introduces aberrations into the image, including negative field curvature, negative axial color, and lateral color. Prism assembly 210 (see FIG. 2) also introduces aberrations into the image. These aberrations are partially compensated for by relay lens 230 and field lenses 240 and 250. Three doublet lenses, 235, 236, and 237, are used in relay lens 230 to minimize the relay lens power to reduce aberrations. Doublets are used to minimize the dispersive effects of each component. A least one doublet is a higher index doublet, which adds axial color and field curvature to compensate for the aberrations introduced by projection lens 310. Field lenses, 240 and 250, also doublet lenses, maintain telecentricity at the intermediate image, which forms at plane 520. The first doublet, lens 240, is located about 30 millimeters in front of intermediate image plane 520, and corrects incident rays to be near-telecentric. Lens 240 also reduces axial color and field curvature. The second doublet, lens 250, is located about 30 millimeters beyond intermediate image plane 520, introduces positive field curvature and axial color, overcompensating for the correction of lens 240. The net contribution to field curvature, and to axial and lateral color introduced by lenses 235, 236, 237, 240, and 250, compensate for the opposite effects introduced by projection lens 310. At projection screen 190 the blue and green images are overlaid, but the red image is axially displaced. The system F-number is established to be slow at the projection screen, so there is a large depth of focus. By design, the field curvature is a tilted plane, rather than a curved surface, due to the compensatory contributions of the projection lens and other lenses to this aberration. The image also has low astigmatism and minimal lateral color. Distortion at the image is straight keystone, the residual pincushion being less than 2 percent. The image quality at the projection screen is sufficient to resolve the 40 pixels per millimeter resolution of the SLMs. This resolution is equivalent to about two pixels per millimeter at the projection screen.

The software predistorts the image to compensate for the keystoning at the image plane. The software also corrects for "image tumbling" by counter-rotating the image data. Image tumbling (i.e., image rotation in the projection screen plane) occurs because the front-end optics present a fixed image onto the rotating projection screen.

Projection screen 190, which is centered on rotation axis 170, is typically formed from a diffusely scattering material. This material scatters incident light substantially isotropically, both in a forward and backward direction. This ensures that a portion of the light corresponding to a pixel in a two-dimensional image slice will be received by a viewer standing in almost any viewing locale around the display, minimizing the dark bands in the three-dimensional image known as "visual dead zones." Designing the projection screen to be as thin as possible can also minimize the visual dead zones.

In the current embodiment, projection screen 190 is semi-circular in shape. In general, embodiments of the invention are not so limited. Projection screen 190 can be any size and shape sufficient on which to form the projected image, so long as they are positioned with minimal offset and eccentricity with respect to the rotation axis.

Also, platform 160 is not limited to the circular platform described above. In general, the platform can be any supporting structure, or combination of supporting structures, sufficient to mechanically couple the back-end optics and projection screen to the motor. In some embodiments, for example, the platform includes a series of radially extending arms for positioning the back-end optics' mirrors appropriately to relay the light beam from the projection lens to the projection screen.

In general, the motor is not limited to frameless DC motor 330. The motor can be any motor coupled to the back-end optics and projection screen, which rotates the back-end optics and projection screen at the desired rate. In some embodiments, for example, the platform is coupled to the motor by belts and/or gears, and the motor is positioned away from the rotation axis.

In some embodiments, an emissive pixelated device can replace the projection engine and lightsource. Examples of such devices include arrays of light emitting diodes, including organic light emitting diodes, or vertical cavity surface-emitting lasers (VCSELs).

A number of embodiments of the invention have been described. Nevertheless, it will be understood that various modifications may be made without departing from the spirit and scope of the invention. For example, the optical components used to relay the image from the projection engine to the projection screen are not limited to those described above. Any combination of lenses, mirrors, diffractive and holographic optical elements, or other light-controlling component may be used for this purpose. Additionally, the image volume, resolution, and gray scale are not limited to the above. Accordingly, other embodiments are within the scope of the following claims.

What is claimed is:

1. A system comprising:
an optical relay having a relay lens and a field lens;
a motor;
a support structure coupled to the motor;
a projection screen disposed on the support structure; and
a projection lens positioned on a rotation axis,
wherein during operation the relay lens receives a light beam from a light source and relays the light beam to the field lens, the field lens relays the light beam to the projection lens which projects the light beam onto the projection screen, and the motor rotates the support structure, the projection screen, and the projection lens about the rotation axis.

2. The system of claim 1, wherein the projection screen defines a plane, and the projection screen is disposed on the support structure so that the rotation axis lies in the plane.

3. The system of claim 1, wherein the projection lens has a lens axis, and the lens axis and the rotation axis define an angle, the angle being no more than about 10 degrees.

4. The system of claim 3, wherein the angle is at least 4.9 degrees and no more than 5.0 degrees.

5. The system of claim 1, wherein the projection lens comprises a triplet lens.

6. The system of claim 1, further comprising a first and second mirror disposed on the support structure, wherein during operation the motor rotates the first and second mirrors about the rotation axis, and the first mirror receives the light beam from the projection lens and directs the light beam to the second mirror, and the second mirror directs the light beam to the projection screen.

7. The system of claim 6, further comprising a third mirror disposed on the support structure, wherein during operation the motor rotates the third mirror about the rotation axis, and the third mirror receives the light beam from the second mirror and directs the light beam to the projection screen.

8. The system of claim 1, wherein the support structure comprises a platform having a hole, and the projection lens is mounted within the hole.

9. A method, comprising:
rotating a projection optic and a projection screen about a rotation axis;
supplying a light beam from a stationary light source; and
projecting the light beam through the projection lens onto the projection screen, and
tilting the projection lens so that a lens axis thereof defines an angle with the rotation axis, the angle being no more than about 10 degrees.

10. The method of claim 9, further comprising rotating a first and second mirror about the rotation axis, wherein the projection optic is a projection lens, and the projection lens projects the light beam onto the first mirror, the first mirror directs the light beam onto the second mirror, and the second mirror directs the light beam onto the projection screen.

11. The method of claim 10, further comprising rotating a third mirror about the rotation axis, wherein the third mirror receives the light beam from the second mirror and directs the light beam onto the projection screen.

12. The method of claim 9, further comprising directing the light beam from the light source onto the projection lens using an optical relay.

13. The method of claim 12, wherein the optical relay comprises a mirror, the method further comprising adjusting the mirror to center the light beam on the projection screen.

14. A system, comprising:
an optical relay;
a motor;
a support structure coupled to the motor;
a projection screen disposed on the support structure; and
a projection lens having a lens axis, the projection lens being positioned on a rotation axis such that the lens axis and the rotation axis define an angle, the angle being no more than about 10 degrees,
wherein during operation the projection lens receives a light beam from the optical relay and projects the light beam onto the projection screen, and the motor rotates the support structure, the projection screen, and the projection lens about the rotation axis.

15. The system of claim 14, wherein the projection screen defines a plane, and the projection screen is disposed on the support structure so that the rotation axis lies in the plane.

16. The system of claim 14, wherein the angle is at least 4.9 degrees and no more than 5.0 degrees.

17. The system of claim 14, wherein the projection lens comprises a triplet lens.

18. The system of claim 14, wherein the support structure comprises a platform having a hole, and the projection lens is mounted within the hole.

19. The system of claim 14, wherein the optical relay comprises a relay lens and a field lens, and wherein during operation the relay lens receives the light beam from a light source and relays the light beam to the field lens, and the field lens relays the light beam to the projection lens.

20. The system of claim 14, further comprising a first and second mirror disposed on the support structure, wherein during operation the motor rotates the first and second mirrors about the rotation axis, and the first mirror receives the light beam from the projection lens and directs the light beam to the second mirror, and the second mirror directs the light beam to the projection screen.

21. The system of claim 20, further comprising a third mirror disposed on the support structure, wherein during operation the motor rotates the third mirror about the rotation axis, the third mirror receives the light beam from the second mirror and directs the light beam to the projection screen.

* * * * *